United States Patent Office  
3,162,643  
Patented Dec. 22, 1964

3,162,643  
PROCESS FOR THE PRODUCTION OF OSAZONES  
Hans Schellenberger, Leverkusen, Willibald Pelz, Opladen, Ottmar Wahl, Baden-Baden, and Walter Puschel, Cologne-Stammheim, Germany, assignors to Agfa Aktiengesellschaft, Leverkusen, Germany, a corporation of Germany  
No Drawing. Filed June 13, 1960, Ser. No. 35,457  
Claims priority, application Germany June 11, 1959  
1 Claim. (Cl. 260—305)

Various processes are known for the preparation of dihydrazones, hereinafter briefly referred to as osazones. For example, 2 mols of a hydrazine, such as for example phenyl hydrazine or derivatives of phenyl hydrazine, can be reacted with 1 mol of an α-diketone, an α-dialdehyde or an α-keto-aldehyde.

Furthermore, it is possible in accordance with a process introduced by E. Fischer for the chemistry of sugar to react α-hydroxycarbonyl compounds, such as α-hydroxy-aldehydes or α-hydroxy ketones, with excess of a hydrazine derivative to form osazones.

In the preparation of osazones, it is also possible to prepare first of all the monoxime from a dicarbonyl compound and then to react the monoxime with 1 mol of a hydrazine to form hydrazone oxime; the latter can then be reacted with a second mol of another hydrazine, hydroxylamine being split off, to form the osazone.

A convenient method of preparing osazones with different hydrazine radicals consists in coupling diazonium salts with carbonyl compounds having an adjacent methylene group. The monohydrazine which is obtained is reacted with a hydrazine derivative to form the osazone. It is often advisable to activate the coupling capacity in the α-methylene carbonyl compounds by substitution with negative groups. Such groups are for example —COOR, —CN, —COR and halogen. In the case of —COOR and —CN, these groups can easily be split off again, so that osazones are likewise obtained, for example when using acoyl acetic acid derivatives.

It has now surprisingly been found that osazones can be prepared by starting from 4-azo-5-pyrazolones substituted in the 4-position and opening the pyrazolone ring while splitting off the carbonyl group. The process can be carried out in such a way that azopyrazolones of the following general Formula A are treated in solution with strongly alkaline agents. The reaction proceeds in accordance with the following equation:

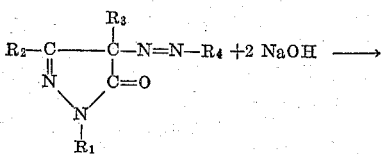

Formula A

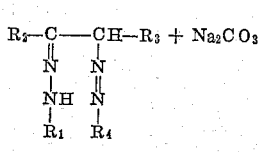

Formula B

Formula B can also be written as the tautomeric formula C:

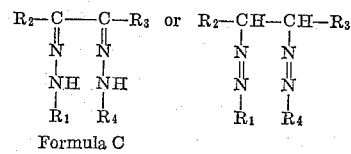

Formula C

In the general formulae A–C, $R_1$ represents alkyl with 1–18 carbon atoms, cycloalkyl as cyclohexyl, aryl as phenyl or naphthyl, aralkyl as benzyl and heterocyclic rings for example benzothiazolyl, pyridyl, pyrazolyl, oxazolyl, thiazolyl or thienyl, it also being possible for these radicals to be substituted by the following groups: —$SO_3H$, —$SO_2$—, substituted hydroxide as —$OC_2H_5$ and —$OC_6H_5$, —CN, halogen, nitro, amino and carbonamide in which the $NH_2$-groups can also be substituted for example by alkyl with 1–18 carbon atoms, cycloalkyl as cyclohexyl, aralkyl as benzyl and aryl as phenyl or naphthyl, —COOH, —COOR, in which R stands for substituted or unsubstituted monovalent hydrocarbon radicals.

$R_2$ represents alkyl with 1–18 carbon atoms, cycloalkyl as cyclohexyl, aryl as phenyl or naphthyl, aralkyl as benzyl, which substituents can also be substituted by the following groups: —$SO_3H$, —$SO_2$—, substituted hydroxide as —$OC_2H_5$ and —$OC_6H_5$, —CN, halogen, nitro, amino and carbonamide in which the $NH_2$-groups can also be substituted for example by alkyl with 1–18 carbon atoms, cycloalkyl as cyclohexyl, aralkyl as benzyl and aryl as phenyl or naphthyl, —COOH, —COOR, in which R stands for substituted or unsubstituted monovalent hydrocarbon radicals, $R_2$ furthermore represents —COOH, —COOR, in which R stands for substituted or unsubstituted alkyl with 1–18 carbon atoms, cycloalkyl as cyclohexyl, aryl as phenyl or naphthyl and aralkyl as benzyl, —$NH_2$ and $CONH_2$, in which the $NH_2$-groups can also be substituted, for example by alkyl, cycloalkyl, aralkyl and aryl.

$R_3$ represents alkyl with 1–18 carbon atoms, cycloalkyl as cyclohexyl, aryl as phenyl or naphthyl, aralkyl as benzyl, it also being possible for these radicals to be substituted by the following groups: —$SO_3H$, —$SO_2$—, substituted hydroxide as —$OC_2H_5$ and —$OC_6H_5$, —CN, halogen, nitro, amino and carbonamide in which the $NH_2$-groups can also be substituted for example by alkyl with 1–18 carbon atoms, cycloalkyl as cyclohexyl, aralkyl as benzyl and aryl as phenyl or naphthyl, —COOH, —COOR, in which R stands for substituted or unsubstituted monovalent hydrocarbon radicals.

$R_4$ represents aryl as phenyl or naphthyl and heterocyclic rings for example benzothiazolyl, pyridyl, pyrazolyl, oxazolyl, thiazolyl or thienyl, it also being possible for these radicals to be substituted by the following groups: —$SO_3H$, —$SO_2$—, substituted hydroxide as —$OC_2H_5$ and $OC_6H_5$, —CN, halogen, nitro, amino and carbonamide in which the $NH_2$-groups can also be substituted for example by alkyl with 1–18 carbon atoms, cycloalkyl as cyclohexyl, aralkyl as benzyl and aryl as phenyl or naphthyl, —COOH, —COOR, in which R stands for substituted or unsubstituted monovalent hydrocarbon radicals.

For carrying out the process, a pyrazolone derivative, the methylene group of which is substituted in the 4- position, is coupled with a diazonium salt and the resulting product is treated with a solution of alkali metal hydroxide or with a strong organic base. The pyrazolone ring is thereby opened and the osazone can be isolated.

The temperature for the opening of the ring depends on the nature of the substituents on the pyrazolone ring and the nature of the substituents on the aryl radical $R_4$ in Formula A. The ring opening usually occurs between 0° C. and room temperature but in some cases temperatures up to about 60° C. are necesasry. The concentration of the caustic alkali solution used for the opening of the ring is likewise dependent on the nature of the substituents on the pyrazolone radical and on the aryl radical. A dilute caustic alkali solution which is normal or twice normal is often sufficient, but frequently a more highly concentrated caustic alkali solution of 20 to 50% is necessary.

The advantage as regards the preparation of osazones by opening the pyrazolone ring consists especially in that asymmetrically substituted osazones are obtained in a convenient manner, in which the radicals $R_1$ and $R_4$ in the Formula B can be different.

It is of course also possible to prepare osazones in which $R_1=R_4$. An additional advantage is that it is possible to obtain osazones which are not obtainable or only obtainable with difficulty by other methods, for example by reaction of α-dihydroxy or α-dioxo compounds with hydrazine, because the preparation of the hydrazine is impossible or is only possible by a very complicated procedure.

The osazones obtained by the process according to the invention are suitable as components for the production of coloured photographic images.

EXAMPLE 1

11.8 g. (0.1 mol) of 3-aminobenzonitrile are diazotised by conventional methods. After the diazotisation, the excess of nitrite is destroyed by amido sulphonic acid and the diazonium salt solution is buffered to a pH value of 5 to 6 by adding solid sodium acetate. This solution is added to a solution of 49.2 g. (0.1 mol) of 1-(4'-sulphophenyl)-3-heptadecyl-4-methyl-5-pyrazolone and 25 g. of sodium acetate in 950 cc. of methanol at 0° C. The mixture is stirred for 30 minutes at 0 to 5° C. and then 40% sodium hydroxide solution is added until the osazone precipitates. It is filtered with suction and washed several times with 25% sodium chloride solution. A pale yellow osazone is obtained, which corresponds in the form of the free acid to the Formula I set out in the enclosed list of formulae.

EXAMPLE 2

27.7 g. (0.1 mol) of 4-aminoazobenzene-4'-sulphonic acid are diazotised by the usual methods, the nitrite excess is destroyed and the diazonium salt is filtered with suction and added at 0° C. to a solution of 58.4 g. (0.1 mol) of 1-(4'-phenoxy-3'-sulphophenyl)-3-heptadecyl-4-methyl-5-pyrazolone and 40 g. of sodium acetate in 950 cc. of methanol. The mixture is stirred for 30 minutes at 0 to 50° C., then a 40% sodium hydroxide solution is slowly added and finally the osazone is precipitated with a large quantity of 40% sodium hydroxide solution.

It corresponds to the acid form of Formula II.

EXAMPLE 3

18.7 g. (0.1 mol) of 3-aminotoluene-ω-sulphonic acid are diazotised by the usual methods. After destroying the excess nitrite, the substance is buffered to a pH value of 5 to 6 by adding solid sodium acetate and the diazonium salt solution is added to a solution of 57.5 g. of 1-(4'-ethoxy-3'-sulphophenyl)-3-heptadecyl-4-ω-cyanoethyl-5-pyrazolone and 25 g. of sodium acetate in 950 cc. of methanol. The mixture is stirred for 30 minutes at 10° C., then adjusted to a pH value of 11 with 10% caustic potash solution and precipitated by adding 50% caustic potash solution. The osazone corresponds in the acid form to the Formula III.

EXAMPLE 4

31.1 g. (0.1 mol) of the sodium salt of 2-amino-toluene-4,5-disulphonic acid are dissolved in water, 7.2 g. of sodium nitrite are added and the substance is diazotised by adding dropwise to 15% hydrochloric acid. The excess nitrite is destroyed, sodium acetate is added until the pH value is 6 and the substance is then added at 0° C. to a solution of 58.4 g. (0.1 mol) of 1-(4'-phenoxy-3'-sulphophenyl) - 3-heptadecyl-4-methyl pyrazolone, as described in Example 2. The osazone is precipitated by adding 2-normal sodium hydroxide solution. For better absorption capacity, 25% common salt solution is added and then filtered with suction. The osazone corresponds in the acid form to the Formula IV.

EXAMPLE 5

12.4 g. of 2-amino-5-benzoylamino-4'-hydroxy-3'-carboxydiphenyl sulphone are dissolved in water and dilute sodium hydroxide solution, slightly more than the calculated quantity of sodium nitrite is added, and diazotisation is effected by introducing the solution dropwise into dilute hydrochloric acid. The excess nitrite is destroyed, the diazonium salt is filtered with suction and added to a solution of 9.4 g. of 1-(4'-ethoxy-3'-sulphophenyl)-3,4-dimethyl-5-pyrazolone and 35 g. of sodium acetate in 300 cc. of methanol and 200 cc. of water. The solution is stirred for about half an hour at 10–20° C., and then made alkaline by adding a mixture of 400 cc. of 10% sodium hydroxide solution and 2000 cc. of 25% common salt solution. The precipitated product is filtered with suction, suspended in 15% common salt solution and the pH value is adjusted to 7 to 7.5 by adding dilute acetic acid. The product is then suction-filtered and dried. The product corresponds in the acid form to the Formula V.

EXAMPLE 6

9.3 g. of distilled aniline are diazotised by the usual method and the diazonium salt solution is adjusted to pH 6 by means of sodium acetate. The diazonium salt solution is added at 0° C. to a solution of 25 g. of 1,3-diphenyl-4-methyl-5-pyrazolone in 600 cc. of menthanol. It is stirred for half an hour at 5 to 10° C., 40% sodium hydroxide solution is added, the temperature is brought to 25° C. and the osazone is filtered off with suction. The osazone is obtained in the form of a resin. By dissolving and re-precipitating from ether and ligroin, a crystalline product is obtained which has a melting point identical with the osazone which was prepared by Müller and v. Pechmann (Ber. 22, 2129, 1889) from 3-phenyl-2,3-propanedione and phenyl hydrazine (M.P. 104–105° C.). The mixed melting point of the compound prepared in different ways shows no depression. The compound corresponds to Formula VI.

EXAMPLE 7

13.7 g. of 3-aminobenzoic acid are diazotised in the usual manner and the diazonium salt solution is buffered to a pH value of 6. This solution is added at 0° C. to a solution of 29.4 g. of 1-(3'-carboxyphenyl)-3-methyl-4-phenyl-5-pyrazolone and 40 g. of sodium acetate in 600 cc. of methanol. The mixture is stirred for half an hour at 10–15° C., made strongly alkaline with 50% caustic potash solution and heated to 40–50° C. The mixture is thereafter cooled and suction-filtered. The product is purified by dissolving in dilute caustic solution and precipitating with dilute acids. The melting point is 125° C. whch is identical with the melting point of the osazone which was prepared from 3-phenyl-2,3-propanedione and 3-carboxyphenyl hydrazine. The compound corresponds in the acid form to Formula VII.

EXAMPLE 8

11.8 g. of 3-aminobenzonitrile are diazotised by conventional methods, the excess nitrile is destroyed and the substance is then buffered to a pH value of 5–6 by adding sodium acetate. The resulting solution is added to a solution of 65.5 g. of 1-(4′-ethoxy-3′-sulphophenyl)-3-(3′-stearoylaminophenyl)-4-methyl-5-pyrazolone and 25 g. of sodium acetate in 950 cc. of methanol.

The mixture is stirred for half an hour at 0° C., 10% sodium hydroxide solution is then added until the solution is strongly alkaline and the osazone is precipitated by adding 25% common salt solution. It is a light yellow compound which corresponds in the acid form to the Formula VIII.

EXAMPLE 9

17.3 g. of aniline-3-sulphonic acid are diazotised in the usual manner. After diazotisation, the excess nitrite is destroyed and the substance is buffered to a pH value 5–6 by adding sodium acetate. The diazonium salt solution is added at 0° C. to a solution of 53.6 g. of 1 - (4′-ethoxy-3′-sulphophenyl)-3-heptadecyl-4-methyl-5-pyrazolone and 25 g. of sodium acetate in 900 cc. of methanol. The mixture is stirred for half an hour at 0° C., piperidine is then added until the reaction mixture is strongly alkaline and the substance is then left to stand for 30 minutes at room temperature. The complete mixture is then concentrated to dryness by evaporation in vacuo, the inorganic constituents which precipitate out are separated at intervals. The product which is obtained is still contaminated with some inorganic salts. The product is dissolved in pyridine, separated from the salt and the substance is precipitaed from the filtrate by adding ether.

The compounds corresponds in the acid form to Formula IX.

EXAMPLE 10

15 g. of 2-aminobenzthiazole are diazotised according to the article by Saunders entitled "The Aromatic Diazo Compounds and Their Technical Applications," 2nd Edition, page 52. The diazonium salt solution is slowly added at −5° C. to a solution of 53.6 g. of 1-(4′-ethoxy-3′-sulphophenyl)-3-heptadecyl-4-methyl-5-pyrazolone and 25 g. of sodium acetate in 900 cc. of methanol. While cooling well, 10% sodium hydroxide solution is added dropwise until the reaction mixture is alkaline, the substance is filtered off with suction from precipitated inorganic salts and the osazone is precipitated with 50% KOH. The compound corresponds in the acid form to the Formula X.

EXAMPLE 11

26.3 g. of 3-amino-4-methoxydiphenyl sulphone are diazotised by the conventional methods. After diazotisation, the excess nitrite is destroyed and the diazonium salt solution is buffered to a pH value of 5–6 by adding solid sodium acetate. This solution is added at 15° C. to a solution of 55 g. of 1-[2′-benzthiazolyl-5′-sulphonic acid]-3-heptadecyl-4-methyl-5-pyrazolone and 25 g. of sodium acetate in 900 cc. of menthanol. After the diazonium salt has been added the mixture is cooled with ice and adjusted to a pH of 12 by adding 5% sodium hydroxide solution. The product is precipitated by adding 25% common salt solution. It corresponds to the sodium salt of the compound of Formula XI.

The compounds disclosed in the above examples may be used for the production of photographic color images by the process of color-forming development as it is for instance disclosed in co-pending application Serial No. 858,052, filed December 8, 1959. According to this process 5 to 15 g. of the osazones are dissolved in 150 cc. of methanol, and the quantity of 10 percent aqueous sodium hydroxide solution necessary for adjusting the solution to a pH value of about 9, and incorporated into 1 kg. of a silver halide emulsion prepared in the usual way. Photographic layers produced from this emulsion are exposed and developed for 5 minutes in a color developer with the composition:

|  | G. |
|---|---|
| Solium hexaphosphate | 1.0 |
| p-Diethylamino aniline sulphate | 2.0 |
| Anhydrous sodium sulphite | 2.0 |
| Potassium bromide | 1.0 |
| Potassium carbonate | 75.0 |
| Water to make 1 litre of solution. | | bleached with an aqueous bleaching bath containing per litre 200 g. of potassium ferricyanide, and fixed in an aqueous hypo-solution. When following this procedure, yellow dyestuff images are obtained at the non-exposed areas of the silver halide emulsion layer.

*List of Formulae*

(I) 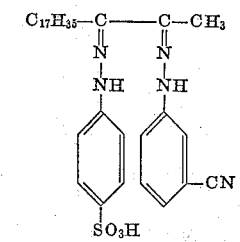

(II) 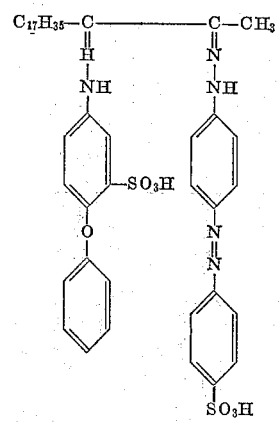

(III) 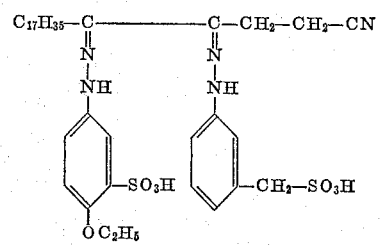

(IV) 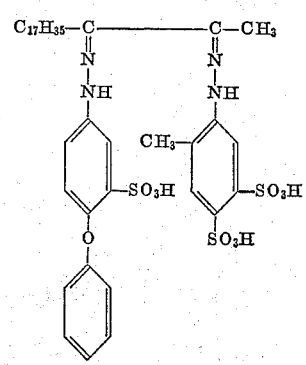

(V) 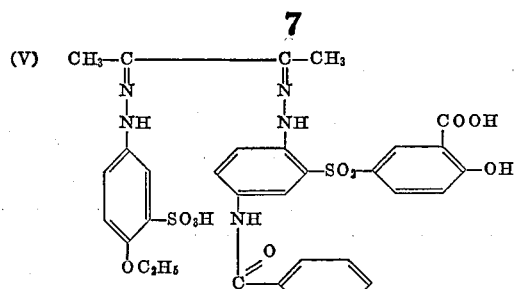

(VI) 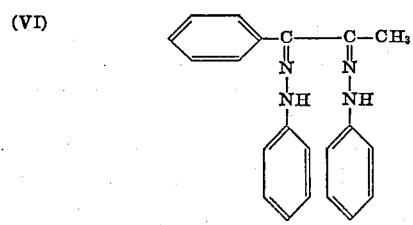

(VII) 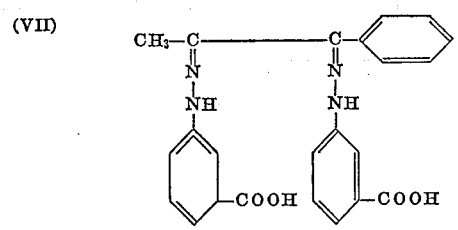

(VIII) 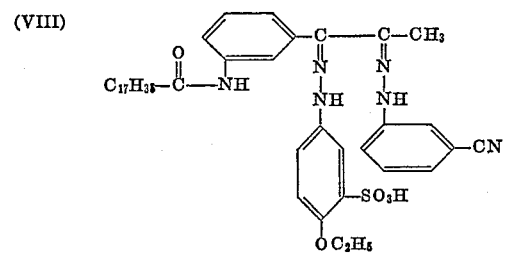

(IX) 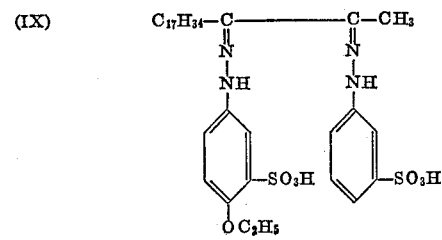

(X) 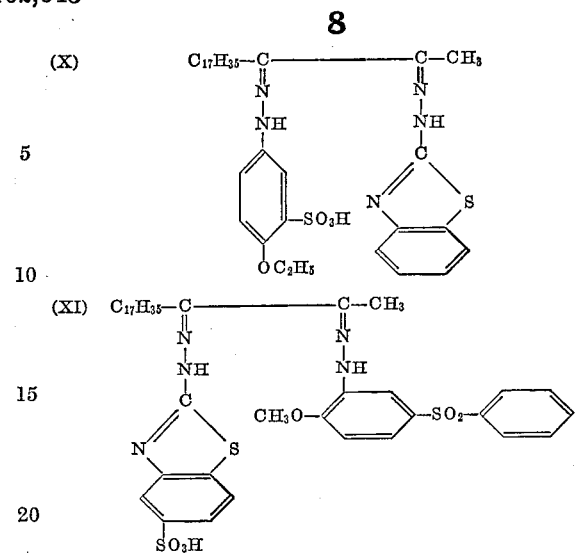

(XI) 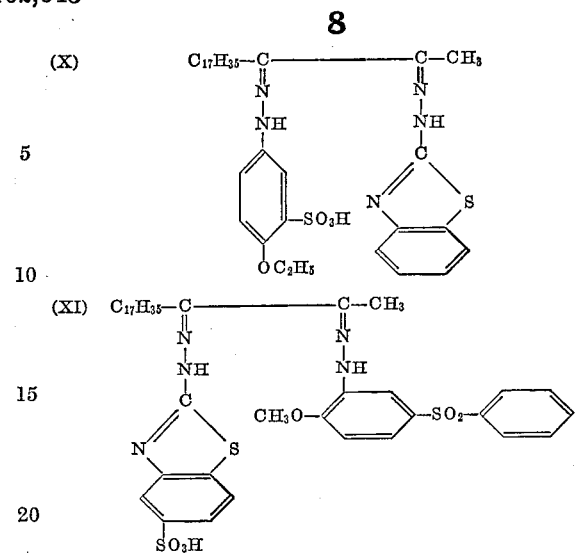

What is claimed is:

A process for producing osazones having the formula

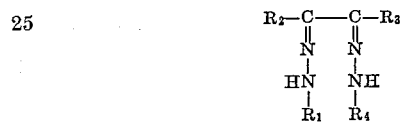

wherein $R_1$ and $R_4$ are selected from the group consisting of phenyl, naphthyl, benzthiazolyl and phenyl substituted by at least one of the following: sulfo, alkoxy, phenoxy, carboxyl, cyano, phenyl azo, alkyl, sulfoalkyl, phenyl sulfonyl and amino; $R_2$ and $R_3$ are selected from the group consisting of alkyl containing not more than 18 carbon atoms, cyanoethyl, phenyl and naphthyl, said process comprising the step of treating a 4-azopyrazolone having the formula

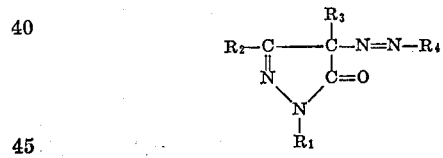

in which $R_1$, $R_2$, $R_3$ and $R_4$ are respectively identical to the corresponding groups in the desired osazone, with a strong base at a temperature sufficiently high to split the pyrazolone ring and produce the osazone.

No references cited.